United States Patent
Liang et al.

(10) Patent No.: US 8,078,647 B2
(45) Date of Patent: Dec. 13, 2011

(54) ONTOLOGY DATA IMPORT/EXPORT METHOD AND APPARATUS

(75) Inventors: Bangyong Liang, Beijing (CN); Hongwei Qi, Beijing (CN); Qiangze Feng, Beijing (CN)

(73) Assignee: NEC (China) Co., Ltd., Beijing (CN)

(*) Notice: Subject to any disclaimer, the term of this patent is extended or adjusted under 35 U.S.C. 154(b) by 482 days.

(21) Appl. No.: 12/238,626

(22) Filed: Sep. 26, 2008

(65) Prior Publication Data

US 2009/0112903 A1    Apr. 30, 2009

(30) Foreign Application Priority Data

Sep. 27, 2007   (CN) .......................... 2007 1 0162924

(51) Int. Cl.
*G06F 17/30* (2006.01)
(52) U.S. Cl. ...................................... 707/802
(58) Field of Classification Search .................. 707/661, 707/688, 701, 737, 749, 791–792, 796, 802–803, 707/809, 810–811; 717/105
See application file for complete search history.

(56) References Cited

U.S. PATENT DOCUMENTS

| | | | | |
|---|---|---|---|---|
| 5,778,359 A * | 7/1998 | Stent | ............................. | 712/300 |
| 7,225,183 B2 * | 5/2007 | Gardner | ............................... | 1/1 |
| 7,424,701 B2 * | 9/2008 | Kendall et al. | ................ | 717/105 |
| 7,475,084 B2 * | 1/2009 | Edelstein et al. | ...................... | 1/1 |
| 7,647,349 B2 * | 1/2010 | Hubert et al. | .......... | 707/999.107 |
| 7,693,900 B2 * | 4/2010 | Wilmering et al. | ............ | 707/713 |
| 7,770,181 B2 * | 8/2010 | Snover et al. | ................. | 719/315 |
| 2002/0189427 A1 * | 12/2002 | Pachet | ............................ | 84/609 |
| 2004/0117346 A1 * | 6/2004 | Stoffel et al. | ..................... | 707/1 |
| 2004/0216030 A1 * | 10/2004 | Hellman et al. | .............. | 715/500 |
| 2008/0172360 A1 * | 7/2008 | Lim et al. | ........................... | 707/3 |
| 2008/0215542 A1 * | 9/2008 | Lim et al. | .......................... | 707/3 |

FOREIGN PATENT DOCUMENTS

JP     8-190479 A     7/1996
JP     10-333952 A    12/1998

* cited by examiner

*Primary Examiner* — Cam-Linh Nguyen
(74) *Attorney, Agent, or Firm* — Sughrue Mion, PLLC

(57) ABSTRACT

The present invention provides a flexible ontology data import/export method and apparatus. The ontology data import apparatus comprises: an ontology data format analyzer for analyzing a format of input ontology data, and performing format determination by utilizing an ontology format database which stores formats of those successfully imported ontologies if it is a private unknown format; and an unknown format data importer for separating and importing the data into an ontology database which stores ontologies, in accordance with a result of the format determination by the ontology data format analyzer. Further, the ontology data export apparatus comprises a keyword-based and query-language-combined ontology exporter and an ontology data export format analyzer, and the keyword-based and query-language-combined ontology exporter outputs a query result returned from the ontology database in accordance with the export format returned from the ontology data export format analyzer.

31 Claims, 9 Drawing Sheets

```
(NEC$$ADDR##TSINGHUA INNOVATION PLAZA)
(VERSA1100$$RDF:TYPE##LAPTOP)
(NEC$$HASPRODUCT##VERSA1100)
FORMAT:
(SUBJECT$$PROPERTY##OBJECT)
```

EXPORT CONTENTS AND EXPORT RULES ARE INPUTTED

Fig. 4a

```
(NEC$$ADDR##TSINGHUA INNOVATION PLAZA)
(VERSA1100$$RDF:TYPE##LAPTOP)
(NEC$$HASPRODUCT##VERSA1100)
```

ONLY CONTENTS BUT NO EXPORT RULES ARE INPUTTED

Fig. 4b

ONTOLOGY DATA IMPORT/EXPORT METHOD AND APPARATUS

BACKGROUND OF THE INVENTION

1. Field of Invention

The present invention relates to the field of data management, and in particular to a flexible ontology data import/export method and apparatus which can import/export ontologies from known standard formats to private formats and enable an ontology management system to be applied to more applications.

2. Description of Prior Art

Ontology is one of the important data semantic representation methods, and the aim of ontology data management is to enable an application to make better use of ontology data so as to achieve an intelligent level. The import and export of ontology data are significant functions in an ontology data management, the function of importing can store ontology data from different sources into an ontology management system, and the function of exporting can represent ontology data in the ontology management system with various formats for use by different applications.

Ontology information can be organized as a plurality of forms including standard formats recognized in the industry, corporate-inside formats used widely within a corporate as well as private formats utilized in certain applications.

The difficult and crucial problems to be solved in the current ontology data management are how to handle the import of an unknown private format in terms of ontology import, and how to export a private format based on different conditions in terms of ontology export.

Currently, there have been some efforts and methods related to ontology import/export.

For example, the system in a first example can import ontologies in known format, and export ontology data congruous to a query condition according to XQL (XML Query Language), and the exported format is also a fixed known format.

FIG. 12 shows the overall operation flow in the first example, where the format acceptable to the system is fixed as Known Format 1, the exported format is also fixed as Known Format 2, and the format determiner of the system decides whether the input format is Format 1 and plainly rejects the import if the answer is NO. As to the export, the system supports complete export under no condition as well as export based on query language. Since the ontology representation language is XML in the system, an XML database is employed to store ontologies, and XQL is used as export language.

Meanwhile, the system in a second example can import ontologies in a fixed format 1 and export ontologies in a fixed format 2, while the ontology is not stored, and the import and export are completed in one pipeline.

The method proposed in JP 10-333952 can separate automatically with a separator the data inside some application into data formed as a table or a list, and then export these data to other applications for further use.

Further, the method in JP 08-190479 performs data conversion based on value range and length of database column type during database conversion, and decides the correspondence between the columns of conversion source and destination.

In summary, the existing methods of ontology import/export can import/export ontologies in fixed known formats, and export ontology data conforming to query conditions based on query language at the time of export. The following problems, however, have not been overcome.

(1) Ontologies in any unknown private format cannot be imported. Importing ontologies in any private unknown format include data separation and determination of property value range and type, while the current methods can handle only data separation and have no ability to determine property value range and type.

(2) It is impossible to export ontologies in any known and unknown format according to search condition for a keyword.

(3) It is impossible to export ontologies in any known and unknown format in the manner of the combination of keywords and query language.

The import/export methods based on text and database can execute format conversion according to data type, while text and database differ considerably from ontology data in that the former is a data carrier, and in the latter there exist concepts, properties and instances, the conversion of which should be considered respectively during the conversion of ontology data. Therefore, remarkable change needs to be made to the data conversion method based on text and database when this method is applied to ontology import.

SUMMARY OF THE INVENTION

In view of the above problems, the present invention provides a flexible ontology data import/export method and apparatus, which can handle ontology data import/export of a known format and an unknown format, export a portion of condition-consistent ontology data in conjunction with keywords and query sentences and store them in a known or unknown format. Due to its excellent adaptability to various formats, the ontology data import/export method and apparatus according to the present invention can meet the requirements from more types of applications.

According to the first aspect of the present invention, an ontology data import apparatus is provided which comprises: an ontology data format analyzer for analyzing a format of input ontology data, and performing format determination by utilizing an ontology format database which stores formats of those successfully imported ontologies if it is a private unknown format; and an unknown format data importer for separating and importing the data into an ontology database which stores ontologies, in accordance with a result of the format determination by the ontology data format analyzer.

According to the second aspect of the present invention, an ontology data import method is provided which comprises steps of: analyzing a format of input ontology data, and performing format determination by utilizing an ontology format database which stores formats of those successfully imported ontologies if it is a private unknown format; and separating and importing the data into an ontology database which stores ontologies, in accordance with a result of the format determination.

According to the third aspect of the present invention, an ontology data export apparatus is provided which comprises: a keyword-based and query-language-combined ontology exporter for receiving a keyword and/or an export format, after processing into a query language, querying ontology data stored in an ontology database which stores ontologies, and requesting an export format to an ontology data export format analyzer; an ontology data export format analyzer for directly returning the export format or obtaining the export format by a query utilizing an ontology format database which stores formats of those successfully imported ontologies, in accordance with the request from the keyword-based and query-language-combined ontology exporter; and the keyword-based and query-language-combined ontology exporter is further for outputting a query result returned from the ontology database in accordance with the export format returned from the ontology data export format analyzer.

According to the fourth aspect of the present invention, an ontology data export method is provided which comprises steps of: receiving a keyword and/or an export format, after processing into a query language, querying ontology data stored in an ontology database which stores ontologies, and requesting an export format; directly returning the export format or obtaining the export format by a query utilizing an ontology format database which stores formats of those successfully imported ontologies, in accordance with the request for the export format; outputting a query result returned from the ontology database in accordance with the returned export format.

According to the fifth aspect of the present invention, an ontology data import/export apparatus is provided which comprises an ontology data import apparatus and an ontology data export apparatus as described above.

BRIEF DESCRIPTION OF THE DRAWINGS

The above objects, advantages and features of the present invention will be apparent from the following detailed description on the preferred embodiments taken conjunction with the drawings in which:

FIGS. 4a and 4b are schematic diagrams showing two input cases of unknown format ontology data, respectively;

FIG. 5b is a schematic diagram for elaborating an example of step S504 in FIG. 5a;

DETAILED DESCRIPTION OF PREFERRED EMBODIMENTS

Now, a detailed explanation will made to the preferred embodiment of the present invention with reference to the figures, during which any detail or function unnecessary to the present invention will be omitted, otherwise it will obscure the understanding of the present invention.

Figure 1:
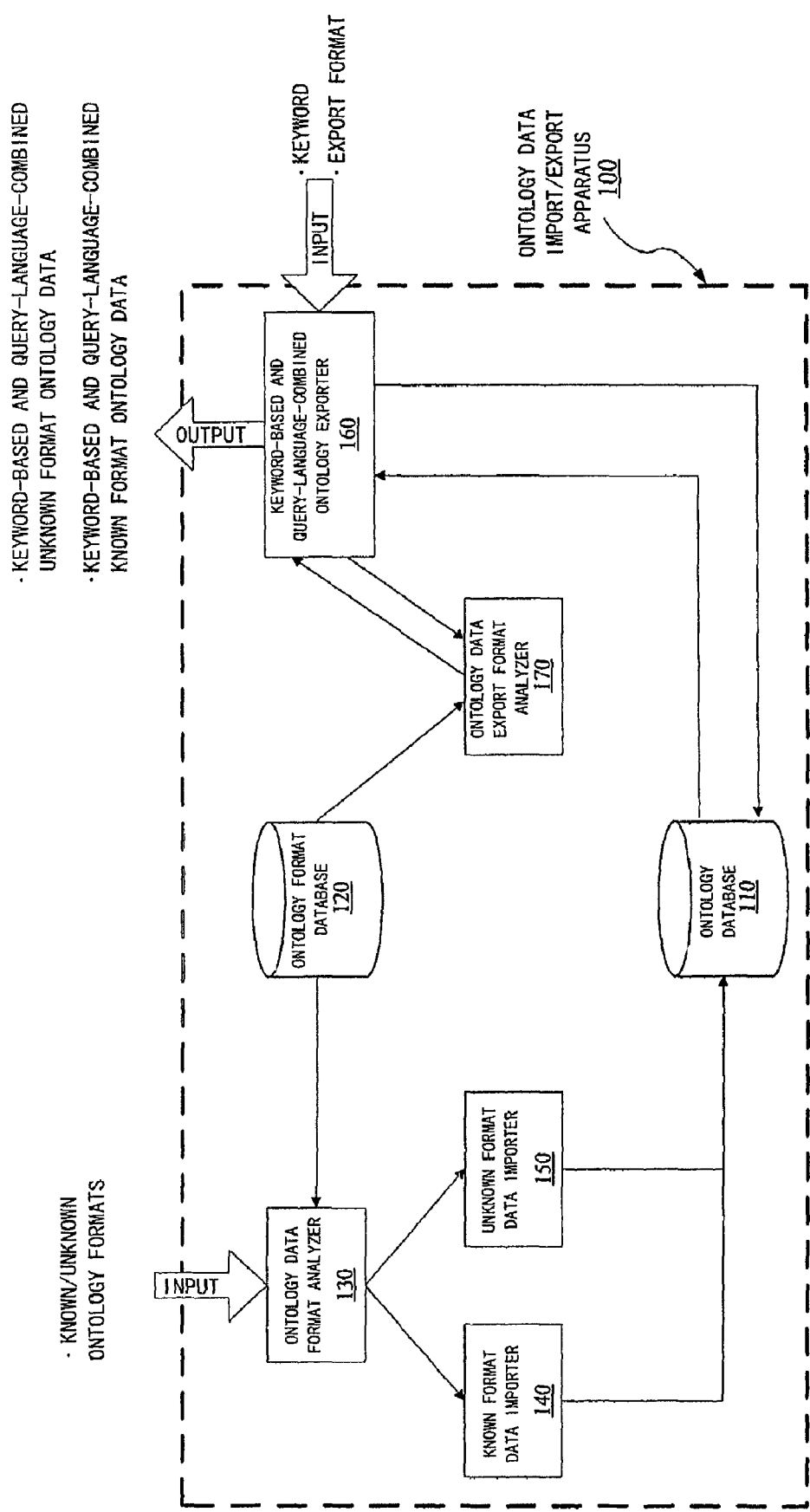
FIG. 1 depicts an overall block diagram of an ontology data import/export apparatus 100 according to the present invention.

FIG. 1 depicts an overall block diagram of an ontology data import/export apparatus 100 according to the present invention.

As shown in FIG. 1, the ontology data import/export apparatus 100 according to the present invention comprises: an ontology database 110 for storing ontologies; an ontology format database 120 containing formats of those successfully imported ontologies in private formats as well as a statistical result of separators included in these formats; an ontology data format analyzer 130 for analyzing a format of input ontology data, and returning directly the format if it is a standard known format, while performing format determination by utilizing the ontology format database 120 if the format is a private unknown format; a known format data importer 140 for importing ontology data of known formats; an unknown format data importer 150 for separating and importing data in accordance with a result from the ontology data format analyzer 130, wherein the value range of a property needs to be generated and the value type of the property needs to be determined during the process of importing; a keyword-based and query-language-combined ontology exporter 160 for receiving one or more keywords and/or export formats, after processing into a query language, querying ontology data, and requesting an ontology data export format analyzer 170 for an export format; the ontology data export format analyzer 170 for returning directly the export format or obtaining the export format by a query utilizing the ontology format database 120, in accordance with the request form the keyword-based and query-language-combined ontology exporter 160; and the keyword-based and query-language-combined ontology exporter 160 is further for outputting a query result returned from the ontology database 110 in accordance with the export format returned from the ontology data export format analyzer 170.

Hereafter, a concrete description will be give to respective components and their operation approaches in the ontology data import/export apparatus 100 of the present invention.

Ontology Database 110

Figure 2:
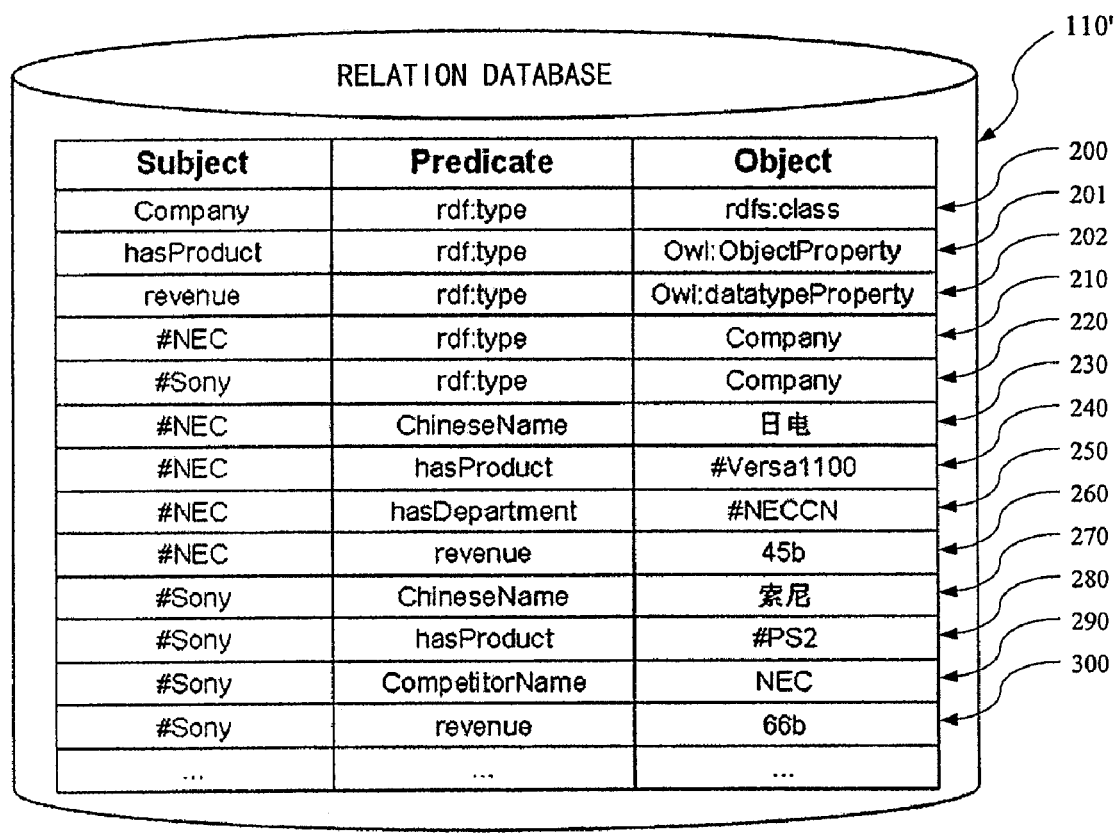
FIG. 2 illustrates a schematic structural diagram of an ontology database 110 represented as a relation-type database 110'.

FIG. 2 illustrates a schematic structural diagram of an ontology database 110 represented as a relation-type database 110'. As shown in FIG. 2, concepts, properties and instances in the ontology database can be represented by triples, respectively, and each triple can be represented as consisting of a subject, a predicate and an object. Different columns are utilized to represent the subject, the predicate and the object respectively in the relation database as shown in FIG. 2. The ontology database contains concepts, properties and instances respectively represented by triples each of which consists of a subject, a predicate and an object. In practice, each of concepts and properties can be represented by one triple, while each instance may need more than one triple for representation.

1) Concept Part

All concepts must be instances belonging to rdfs:class. That is, for any concept x, there is one triple (x rdf:type rdfs:class) in the ontology database. The inheritance relationship between concepts is denoted by rdfs:subClassOf. In other words, if x belongs to the subclass of y, there exists a triple (x rdfs:subClassOf y). As an example, the entry 200 is the definition for concept Company in FIG. 2. The triple representing a concept has determined predicate and object and thus can be denoted as (?x rdf:type rdfs:class), where ?x is the name of the represented concept.

2) Property Part

Properties define the characteristics of concepts as well as the relationship between concepts, the property denoting concept characteristics is referred to as numerical-type property, and the property denoting the relationship between concepts is referred to as objective-type property. Both of the numerical property and the objective property have definition domain and value domain, the definition domain means which concepts the property works at, for example, the definition domain for the property "age" is the concept "human". That is, "age" is a property of the concept "human" rather than any other concept. The value domain defines the range of the value for the property. The value domain can be of data type, such as integer, real number or character string, if the property has numerical type, while the value domain can be of concept type if the property is of objective type. As an example, the definition domain of the objective property "friend" is "human", and its value domain is also "human". In FIG. 2, for example, the entries 201 and 202 are the definitions for the property hasProduct and revenue, respectively. The triple representing a property has determined predicate and object and thus can be denoted as (?x rdf:type rdfs:property), where ?x is the name of the represented property.

3) Instance Part

Instances are specific matters under a concept, for example, "Jack" is an instance of "human". Instances of a concept have values of properties whose definition domains lie in the concept, say, "Jack" has the value "35" of the property "age". In FIG. 2, for example, the entries 210 and 220 are definitions for the instance #NEC and #Sony of "Company". Each instance consists of multiple triples, which denote the type of the instance and the values of the properties belonging to the instance.

At the time of import, a concept, a property and an instance are formed as a corresponding triple, respectively, based on the input ontology data, and these triples are stored in the ontology database. During the export process, the record of the triples, which fulfill certain conditions, is exported.

Ontology Format Database 120

Figure 3:
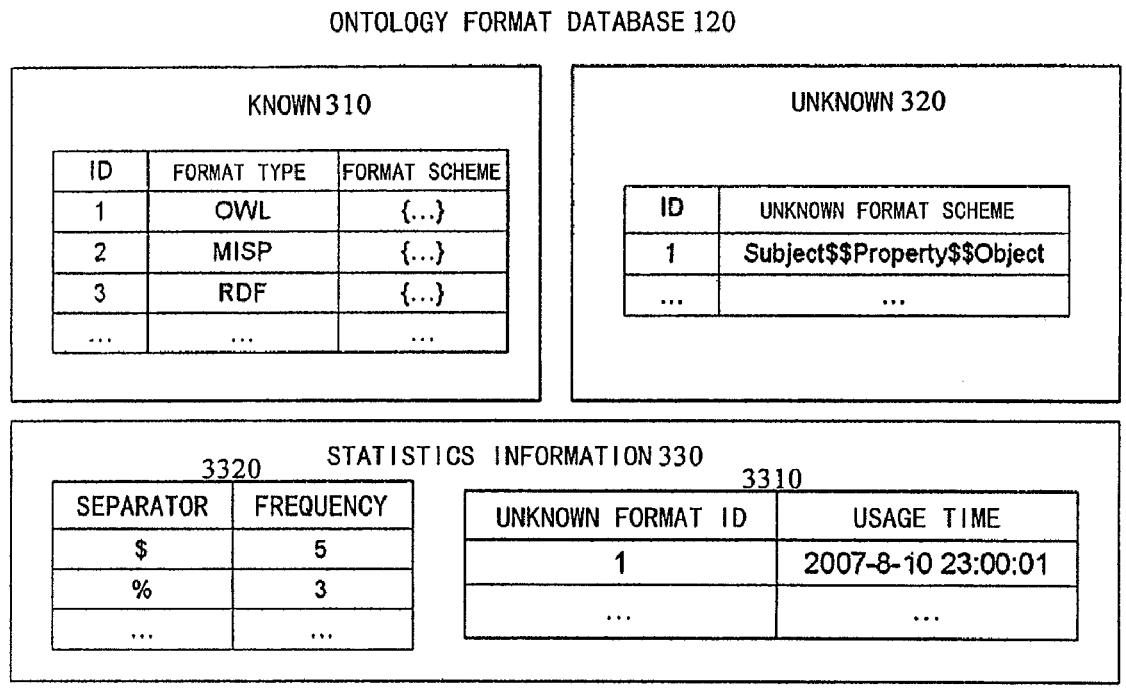
FIG. 3 shows a schematic structural diagram of an ontology format database 120 according to the present invention.

The ontology format database 120 is employed to analyze formats, and, as shown in FIG. 3, the information stored in the ontology format database 120 includes three types:
1. registered known ontology types and formats 310, such as OWL, MISP, etc.;
2. previously used private unknown formats 320; and
3. statistics information 330 containing records 3310 for those imported private unknown formats as well as statistics records 3320 for those separators used in the private unknown formats.

The private unknown formats 320 are generally organized as triples, each of which is separated by specific separators, and the separated parts correspond to the subject, the property and the object of the triples in an ontology data, respectively. The example of a private format is #NEC$$rdf:type$$Company. The separated triple corresponding to this private unknown format is Subject$$Property$$Object. While storing the private unknown formats, the ontology format database 120 stores how many times each separator has been used in these formats. For example, the usage frequency of "$" will be increased by 1 after the above format is placed into the ontology format database (referring to statistics information 3320 in statistics information 330).

Ontology Data Format Analyzer 130

The ontology data format analyzer 130 is responsible for analyzing a format of input ontology data, and selecting the known format data importer 140 or the unknown format data importer 150 to import ontology data, depending on the different formats of input ontology data. The ontology data format analyzer 130 operates as follows.

(1) If the ontology data has a known format, the ontology data format analyzer 130 returns this format;

(2) If the ontology data is of an unknown format, the ontology data format analyzer 130 analyzes this unknown format. Inputting an unknown format may include two cases. As shown in FIGS. 4a and 4b, one case is that both ontology data content and format explanation are included in the command for importing the unknown format, as shown in FIG. 4a. The other case is that only ontology data content is included in the command for importing the unknown format, while format explanation is not contained, as shown in FIG. 4b.

Figure 5A:
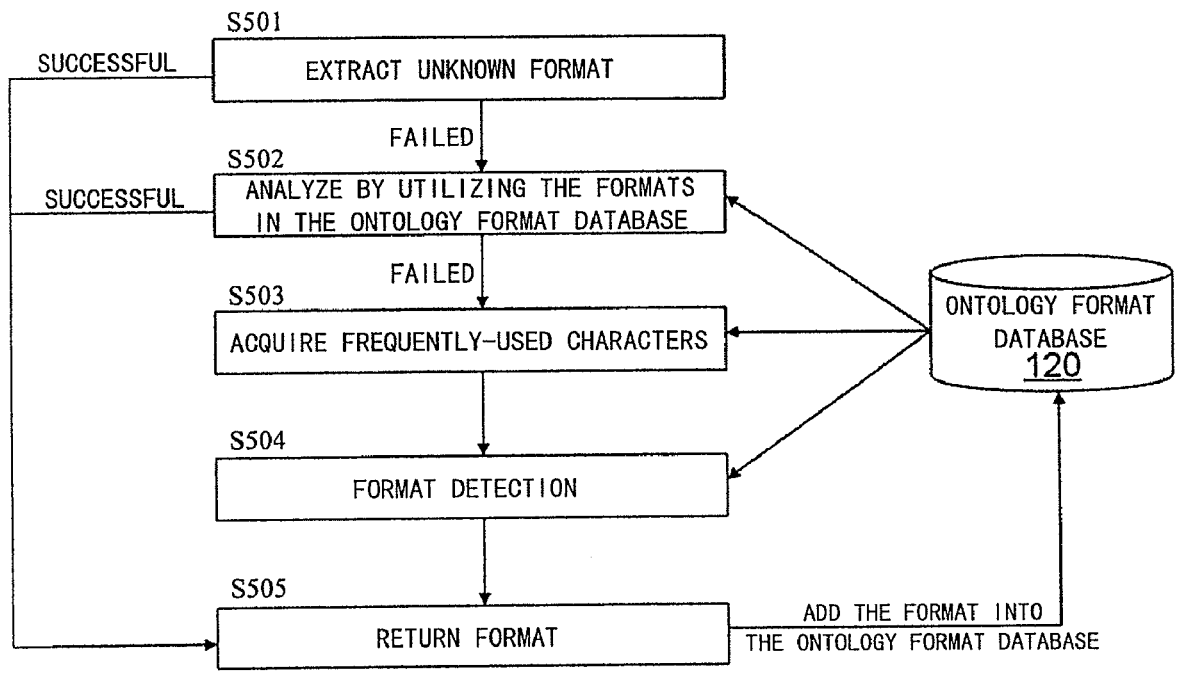
FIG. 5a shows a flowchart for the unknown format import operation of an ontology data format analyzer 130.

More specifically, the unknown format import operation flow of the ontology data format analyzer 130 is illustrated in FIG. 5a.

At step S501, if the input of the unknown format contains format information as shown in FIG. 4a, the flow will proceed to step S505, where the format information is directly extracted, the format is added into the ontology format database 120, and the content and format information is directly input to the unknown format importer 150.

At step S502, if the input of the unknown format does not contain any format information, as shown in FIG. 4b, all unknown formats are first taken out of the unknown format table in the ontology format database 120, and then certain analysis is performed by utilizing these unknown formats. If the analysis with an unknown format is successful, this format is the format of the input ontology data, and the flow jumps to step S505 where the content and format information is directly input to the unknown format importer 150.

At step S503, if none of the historical unknown formats in the ontology format database 120 meet the requirement, n most-frequently used separators, such as "$", "#", ";", "*", "%" and the like, are extracts from a separator database in the ontology format database.

Figure 5B:
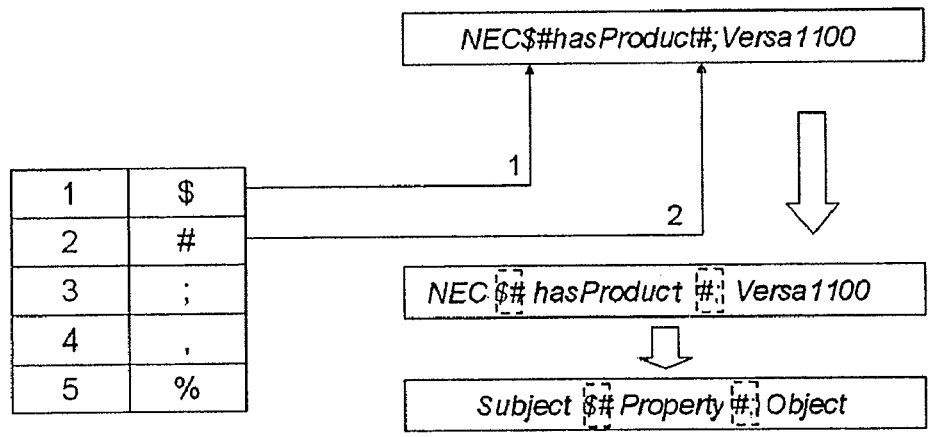

At step S504, the following operations are repeated for each of the n separators:

in some row (corresponding to a single instance) of the input contents, a search for this separator is performed; if a occurrence position corresponding to this separator can be found, then forward and backward separator detections are continuously performed from this position; to be more specific, in the example shown in FIG. 5b, if "$" is found at the position 3 in the example of NEC$hasProduct#;Versal1100, search is first conducted on a position (position 2) smaller than the position 3, and 'C' is found, which is not within the set of frequently-used characters; thereafter, search is conducted on a position (position 4) larger than the position 3, and the character '#' is found, which belongs to the set of frequently-used characters; then the search is continued to the following position where the character 'h' is found, which is not within the set of frequently-used characters; therefore, (position 3, position 4) is referred to as a separation area, and the positions which have become separation areas will not experience search operation during the subsequent search for this instance; in other words, the above (position 3, position 4) will be skipped in the subsequent search for this instance; when two separation areas can be found for this instance, a corresponding separation format is generated, and the flow turns to step S505 where the generated separation format and the contents are input together to the unknown format data importer 150.

At step S505, the format, which is extracted, analyzed or generated by formation detection, is returned.

Known Format Data Importer 140

Figure 6:
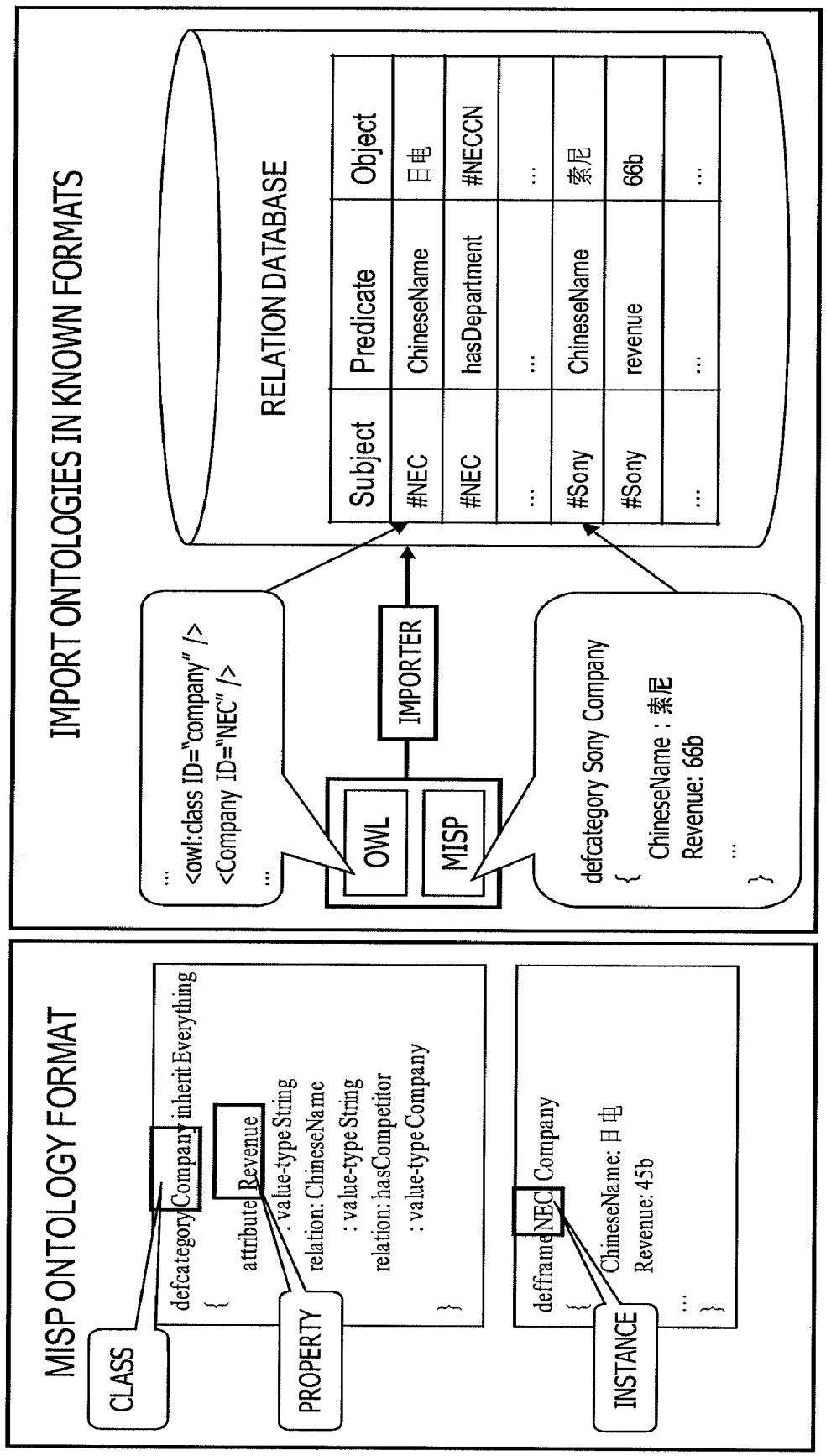
FIG. 6 shows a schematic diagram of a known format importer 140.

Each known format registers an import module in the known format data importer 140, and thus the known format data importer 140 only needs to invoke a corresponding import module for importing in accordance with the input format, as shown in FIG. 6. OWL is a public known standard, and MISP is a known standard inside a corporate in FIG. 6. What the known format data importer 140 needs to do is only to invoke corresponding import modules for importing (e.g., for OWL format standard, see Reference http://www.w3.org/TR/owl-features/).

Since the standard has been published, the known format data importer 140 can extract the concept, the property and the instance from the input ontology contents, generate corresponding triples and then import them into the ontology database 110.

Unknown Format Data Importer 150

After receiving the format and content information from the ontology data format analyzer 130, the unknown format data importer 150 needs to analyze the subject, the predicate and the object so as to determine an import approach. Different processing methods are employed for the subject, the predicate and the object and described particularly as follows.

1. The subject is processed into rdf:resource, since the subject must be an instance.
2. As for the predicate, the definition domain is processed into rdf:resource to correspond to the subject, while the following judgment should be performed at the time of the determination of value domain:
   1) analyzing whether any numerical value including integer and real number for this predicate appears in the triples where this predicate lies in; if any numerical value has been appeared with respect to this predicate, defining the value domain of the predicate as numerical type, and simultaneously forming the predicate into a property of numerical type;
   2) if no numerical value has been appeared with respect to this predicate, considering two cases: one is that the value for the predicate is URI (Unified Resource Identification), and the value domain of the predicate is a objective-type property of rdf:resource (see Reference http://www.w3.org/TR/owl-features/); the other case is that the value domain of the predicate is a numerical-type property of character string; in FIG. 7, ① denotes the former case, and ② denotes the latter.
   The following analysis is conducted to determine which of the above two cases the value of the predicate belongs to:
   acquiring all the values of the predicate, and if part or all of the URIs of these values can be found in the subject, the predicate should be a property of objective type, and the URIs present in the subject correspond to rdf:resource of the subject, while the URIs not present in the subject correspond to new rdf:resource which should be created in the ontology database; if none of the URIs can be found in the subject, inputting them into the ontology database for further search; since each URI is globally unique, the predicate is still referred to as a property of objective type if a corresponding rdf:resource can be found in the ontology database; otherwise, the predicate is considered as a numerical-type property with a character-string value domain.
3. The triple is directly imported if the predicate is identified as a property of numerical type (including a numerical-type property having an integer or real number value domain as well as a numerical-type property having a character-string value domain); the triple is directly imported if the predicate is identified as a property of objective type and the URI of the object exists in the ontology database; the above rdf:resource needs to be created and then the triple is imported if the URI of the object is not present in the ontology database.

After the completion of the above steps, the unknown ontology format is imported into the ontology database 110.

Figure 7:
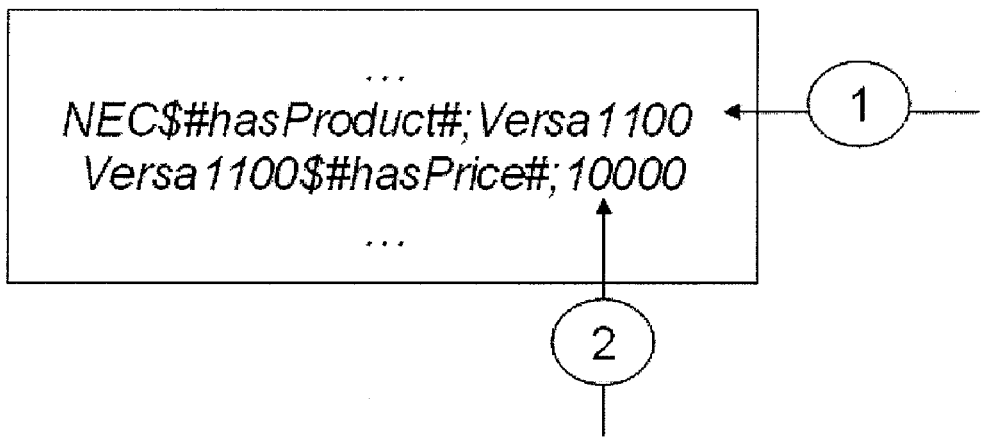
FIG. 7 shows a concrete example of an unknown format import operation.

FIG. 7 shows a concrete example of the unknown format import operation flow. Referring to FIG. 7, the subject NEC should be acquired at first with respect to ontology data of an unknown format NEC$#hasProduct#; Versa1100. Since the subject "NEC" has not yet existed, a corresponding rdf:resource should be created as (NEC rdf:type rdf:resource).

Then, the predicate "hasProduct" is acquired for type determination. At the moment, the object "Versa1100" is acquired. Since "Versa110" appears in the subject, too, "hasProduct" is of objective type, and a corresponding objective-type property is generated as (hasProduct rdf:type owl:ObjectProperty).

Next, the object "Versa1100" is acquired, and a corresponding rdf:resource (Versa1100 rdf:type rdf:resource) is created due to the absence of "Versa1100".

Finally, the property value of NEC (NEC hasProduct Versa1100) is imported.

On the other hand, the subject "Vers" is first acquired for the ontology data of an unknown format Versa1100$#hasPrice#; 10000, and there is no need for creating rdf:resource since the subject has been present.

Then, the predicate "hasPrice" is acquired for type determination. At the moment, the object "10000" is acquired. Since "10000" is of numerical type, a numerical-type property is created as (hasProduct rdf:type owl:datatypeProperty).

Next, the object "10000" is acquired.

Finally, the property value of Versa1100 (Versa1100 hasPrice 10000) is imported.

Keyword-Based and Query-Language-Combined Ontology Exporter 160

There are two types of export in ontology data export, one is exporting all ontology data, which can be referred to as unconditioned export, and the other is exporting part of ontology data, which can be referred to as conditioned export. Condition can be formed by use of keywords and query sentences, and thus the definitions are first give to keywords and query sentences.

Figure 8A:
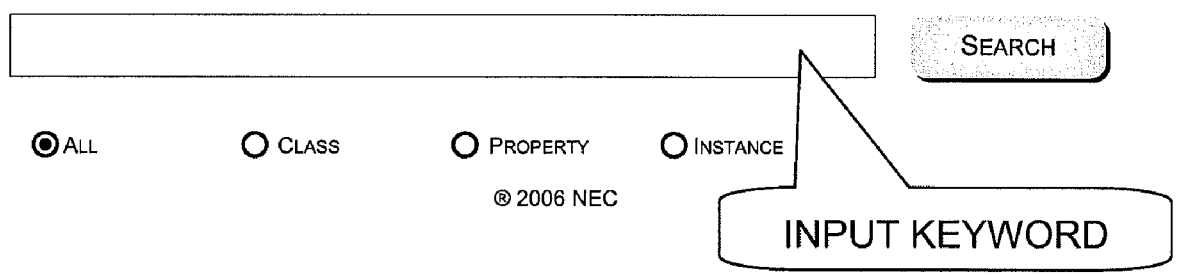
FIG. 8a-8c show schematic diagrams of a query input interface.

Keywords mean one or more vocabulary composed of natural language, and the input of keywords is relatively simple and thus suitable for use by preliminary users. The input interface of keywords in the system is shown in FIG. 8a, as seen in which, the input of keywords has a simple form, and thus general users having no knowledge of ontology can use keywords to perform ontology export. Examples of keywords include "Tsinghua University", "National Electrical Corporation", etc.

Figures 8B, 8C:

Query sentences mean a query approach which has the syntax of some query language, can execute complex condition specification and can query data of specific structures. The input interface of query sentences in the system is shown in FIG. 8b, as seen in which, query sentences have certain syntax and thus can be used only by those having necessary professional knowledge. A simple example of query sentences is illustrated as:

select ?x ?y ?z where {?x ?y ?z.}

The query target of this sentence is all the triples in the ontology.

Keyword query has advantage of simple and accessible to ordinary users, while its shortcoming is that the query target that can be specified is not precise enough, and therefore it is impossible to make full use of semantics in ontology data. For example, when "Tsinghua University" is queried, it cannot be specified which position the "Tsinghua University" appears in an instance. On the other hand, a query sentence can specify clearly the concrete semantics of "Tsinghua University".

Now, considering the following two instances:

Instance 1,
  name: Tsinghua University, location: Zhongguancun East Road No. 1, Beijing Instance 2,
  name: Innovation Building, location: Tsinghua University When a keyword is used in exporting, "Tsinghua University" is inputted, and the two instances will be exported since both of them match the condition. As such, keywords cannot make good use of the semantics of ontology data, since it cannot express the export target: an instance named as "Tsinghua University". Query language, however, can fulfill this task, since the instance named as "Tsinghua University" can be represented as the following query language:

select ?x where {?x <name> "Tsinghua University".}

Query language can also perform complex conditional operations, such as AND, OR and NOT, and thus make full usage of the semantics in ontology data.

The present invention integrates the advantages of keyword and query language and provides a query method on the basis of the combination of keywords and query sentences (see FIG. 8c), which method enables ordinary user to input keywords conveniently on one hand, and on the other hand, has the benefit of query ontology data by utilizing query sentences.

Figure 9:
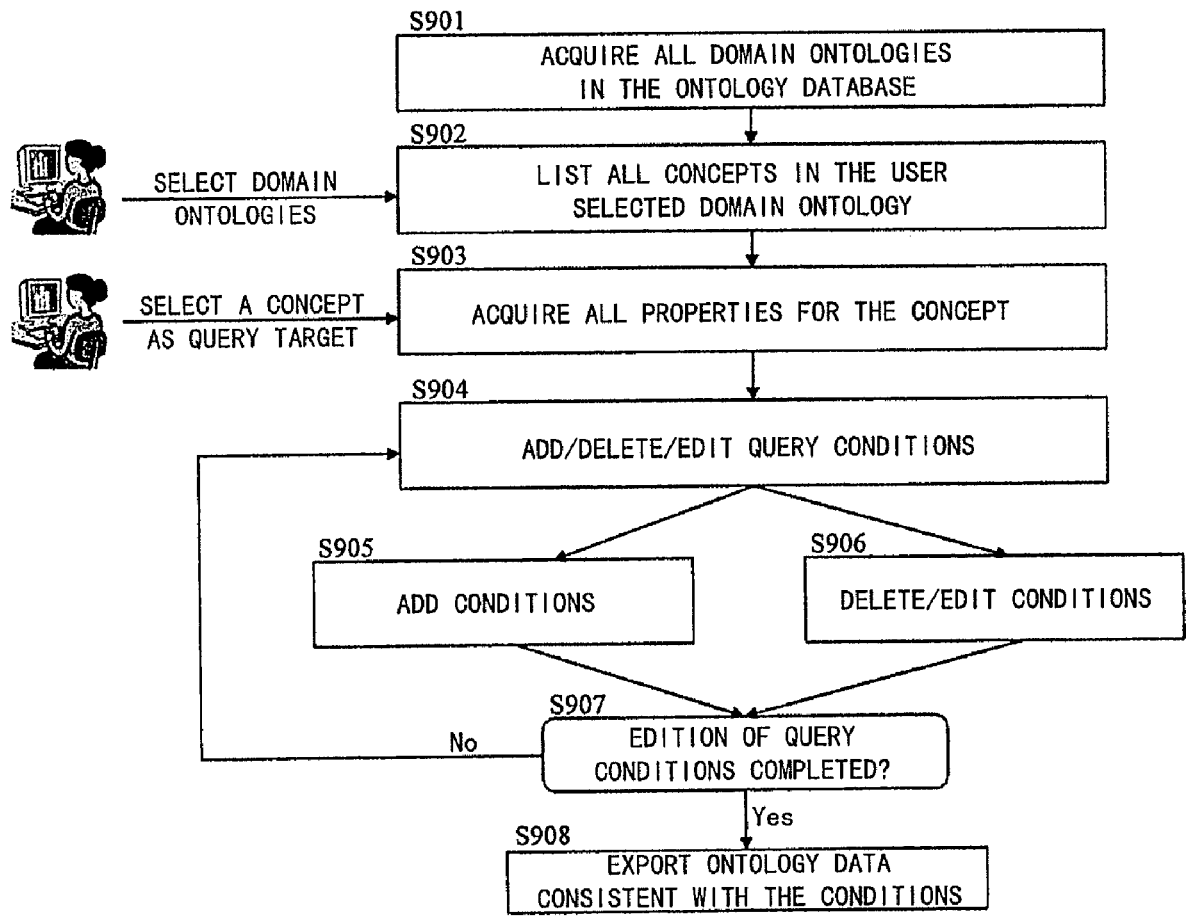
FIG. 9 shows a flowchart of a keyword-based and query-language-combined export method according to the present invention.

FIG. 9 shows a flowchart of a keyword-based and query-language-combined export method according to the present invention.

At step S901, all domain ontologies in the ontology database is acquired and listed for a user to select.

At step S902, after the user has selected a domain ontology, all concepts within the domain ontology is acquired and listed for the user to select a query target.

At step S903, when the user has selected a concept as the query target, all properties of the concept are acquired for the user to add/delete/edit query conditions.

At step S904, the user starts to add/delete/edit query conditions.

At step S905, the query conditions are added: the user selects a property and chooses from 7 forms of condition setting:

"=", applicable to properties of numerical and object types, strictly equal to;
"!=", applicable to properties of numerical and object types, strictly unequal to;
"<=", applicable to numerical type with a value of integer or real number, less than or equal to;
"=>", applicable to numerical type with a value of integer or real number, greater than or equal to;
"<", applicable to numerical type with a value of integer or real number, strictly less than;
">", applicable to numerical type with a value of integer or real number, strictly greater than; and
"contain", applicable to the numerical type with a value of character string, containing a certain character string.

Then, keywords or numerical values are inputted with respect to the selected properties and conditions.

At step S906, deletion or edition of query condition can be imposed on the added query conditions.

At step S907, query can be executed if all the query conditions have been edited; otherwise, the flow returns to step S904.

At step S908, ontology data conforming to the conditions are acquired and exported.

As an example, the query of an instance named "Tsinghua University" can be conducted through the above steps:

at step S901, selecting the ontology "MISP";
at step S902, listing all classes in the ontology "MISP";
at step S903, selecting the class "school";
at step S904, beginning to add query conditions;
at step S905, selecting the property "name" and "=", and then filling in the keyword "Tsinghua University";
at step S907, the query can be started after all the query conditions have been edited;
at step S908, obtaining the export result.

In this way, the user needs to just select and input the keyword during the above procedure. It is unnecessary for the user to know about ontology query language, and thus the user group of ontology semantics is expanded.

After receiving the query conditions and keywords, the system generates corresponding query sentences to conduct query in the ontology database 110, acquires all the ontology data satisfying the query conditions and inputs them into the keyword-based and query-language-combined ontology exporter 160. Returning to the above example, the system generates the following query sentence as the final result according to a series of actions by the user:

select ?x where {?x<name> "Tsinghua University.}

Figure 10:
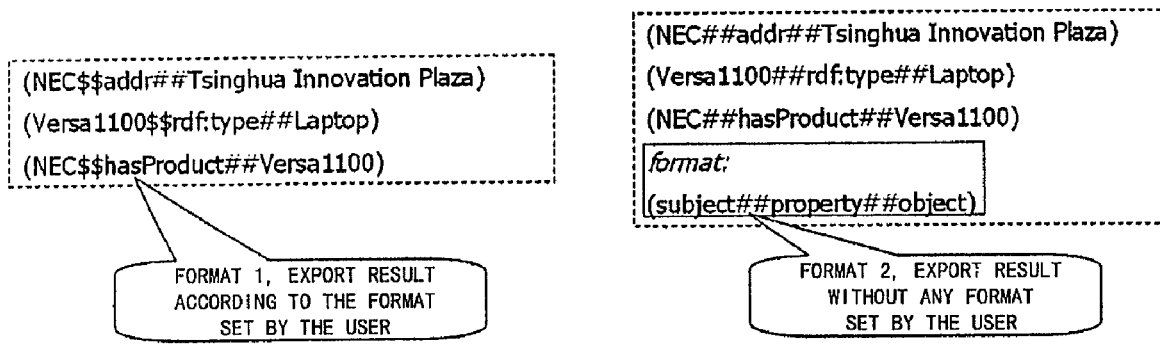
FIG. 10 is a schematic diagram showing two export cases of ontology data.

Those ontology data which satisfy the query conditions can be obtained through this query sentence and then exported. The export format is determined by the ontology data export format analyzer 170, and the exported data have two types as shown in FIG. 10.

As to the first format, the exported data need not to carry any format since the export command by the user has taken the export format with itself. For the second format, since the user has not give any explanation of format in the export command, it is necessary to provide the user with the format recommended by the system so that the user can operate the ontology data by utilizing the format.

Ontology Data Export Format Analyzer 170

The ontology data consistent with the export conditions may be exported with a known industrial standard format (e.g. OWL) or a known standard format within a corporation (e.g. MISP), and may be exported with an unknown format. At the time of data export, the export command includes the export condition and export format.

As an example, the export command is
(criteria: none, format: OWL).

This is an unconditioned export command which requires the export format to be OWL. Therefore, the ontology data will be exported as an OWL file.

Another example of the export command is
(criteria: select ?x where {?x<name> "Tsinghua University.})

This is an export command which has only export condition but no export format.

Figure 11:
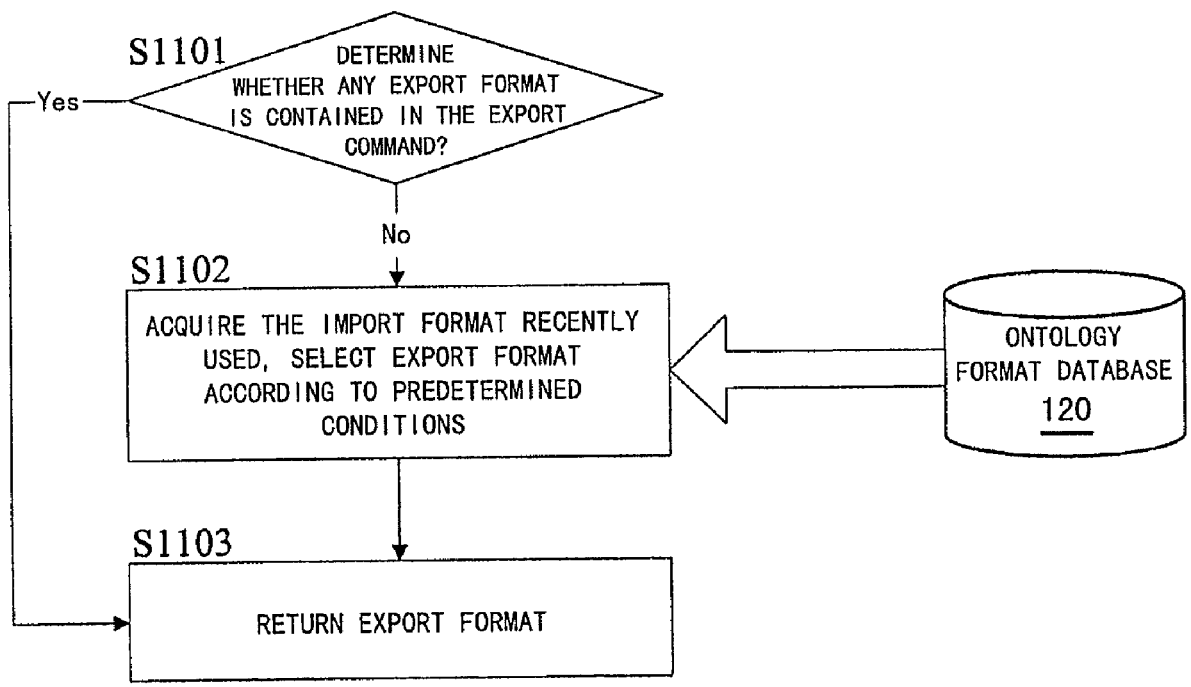
FIG. 11 shows a operation flow of an ontology data export format analyzer 170.
Figure 12:
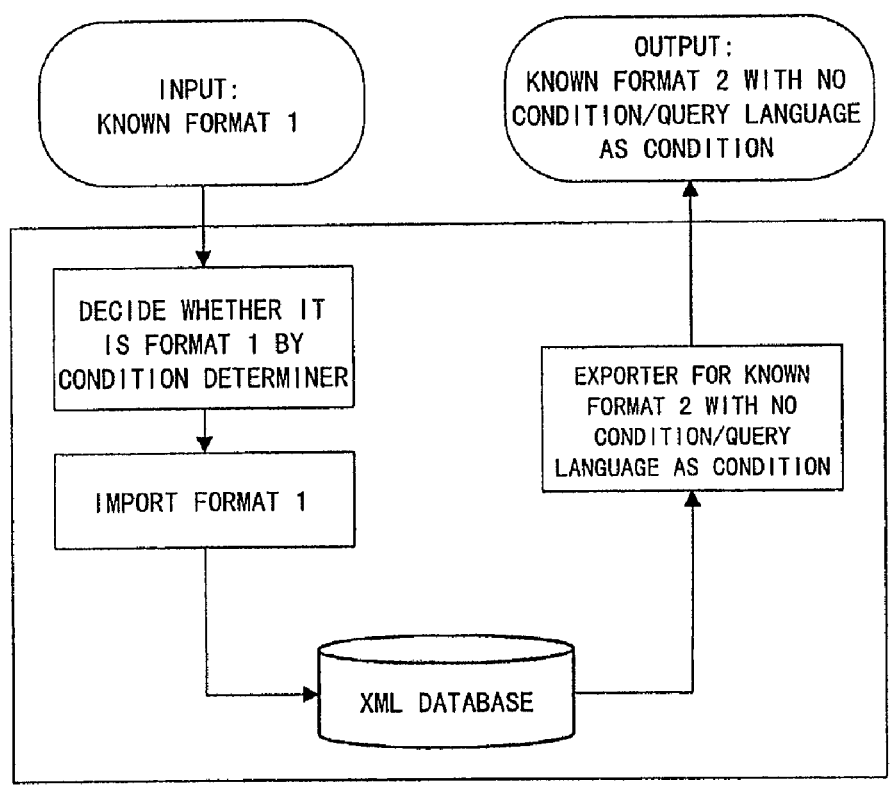
FIG. 12 shows an overall operation flow described in a first example.

When receiving this kind of command, the ontology data export format analyzer 170 operates in the flow as shown in FIG. 11.

At step S1101, the ontology data export format analyzer 170 determines whether the export command requires certain export format, and if certain export format is required, the flow turns to step S1103 and the format is returned directly.

At step S1102, if no export format is specified in the export command, the format recommendation needs to be done, which process can be based on the latest and most frequently used export format. Thus, two parameters are required, one being time period n, and the other being threshold threshold.

The details are given as:
  a) within the time period n, extracting all the formats which have been used to import unknown format ontologies successfully, and denoting them as a format set rs;
  b) for each format r in the format set rs, calculating its usage rate rate: rate=the times the format r has been used/ the total times all the format in the format set rs have been used;
  c) selecting the maximum usage rate $rate_{max}$; using this format as the format of the exported ontology data if $rate_{max}$>=threshold; and if the maximum usage rate $rate_{max}$<threshold, making n=n*1.5 and threshold=threshold *0.5, returning to sub-step a) and resuming the operation.

Naturally, the operation suggested above is intended to exemplary, and those ordinarily skilled in the art can make adaptations as necessary. For example, in order to reduce the operational complexity, the format corresponding to the maximum usage rate $rate_{max}$ can be selected directly as the export format, instead of the cyclic operation as demonstrated above.

At step S1103, the export format contained in the export command or that selected at step S1102 is returned.

The present invention has been described in conjunction with the preferred embodiments. It should be understood that those ordinarily skilled in the art can make various changes, substitutions and additions within the principle and scope of the present invention. Therefore, the scope of the present invention is not limited to the above particular embodiments but should be defined by the appended claims.

What is claimed is:

1. An ontology data import apparatus, comprising:
an ontology data format analyzer device configured to analyze a format in which input ontology data is encoded, and perform format determination by utilizing an ontology format database which stores decoding information for decoding formats of successfully imported ontologies, the decoding information including decoding information for decoding a private unknown format; and
a private unknown format data importer device configured to decode, separate and import the encoded ontology data into an ontology database, which stores ontologies, in accordance with a result of the format determination by the ontology data format analyzer device,
wherein when analyzing the format in which the input ontology data is encoded, for a private unknown format, if the private unknown format contains format decoding information, then the ontology data format analyzer device directly extracts the format decoding information and adds the private unknown format into the ontology format database, and provides the contents and format decoding information of the ontology data directly to the private unknown format data importer device,
wherein when analyzing the format in which the input ontology data is encoded, for a private unknown format, if the private unknown format does not contain format decoding information, then the ontology data format analyzer device gets decoding information for decoding all private unknown formats stored in the ontology format database,
wherein if the private unknown format in which the input ontology data is encoded matches with any of the stored decoding information for decoding private unknown formats, then the ontology data format analyzer device decides to use this matched decoding information for decoding the private unknown format, and provides the contents and format decoding information of the ontology data to the private unknown format data importer device,
wherein when analyzing the format in which the input ontology data is encoded, for a private unknown format, if the private unknown format does not contain format decoding information, then the ontology data format analyzer device extracts decoding information for decoding all private unknown formats stored in the ontology format database, and
wherein if the input private unknown format does not match with any of the stored decoding information for decoding private unknown formats, then the ontology data format analyzer device extracts n most-frequently used separators from a separator database in the ontology format database, and for each of the n separators, repeatedly performs the following operations:
in the input contents, a search for this separator is performed;
if a position of this separator is correspondingly found, then forward and backward separator detections are continuously performed from this position;
an area consisting of continuous separators is determined as a separation area;
if two separation areas are found, then a corresponding separation format is determined and generated as a detected private unknown format; and
the ontology data format analyzer device provides the contents and format decoding information of the ontology data to the private unknown format data importer device.

2. The ontology data import apparatus according to claim 1, wherein:
the ontology database contains concepts, properties and instances respectively represented by triples each of which consists of a subject, a predicate and an object.

3. The ontology data import apparatus according to claim 2, wherein the ontology data format analyzer device directly returns the requested format if it is a standard known format,
wherein the ontology data import apparatus further comprises: a known format data importer device configured to import ontology data encoded in known formats into the ontology database,
wherein the decoding information for decoding formats of successfully imported ontologies that is stored in the ontology format database includes registered known ontology types and formats, previously used private unknown formats and statistics information, and
wherein the statistics information includes statistics records for successfully imported private unknown formats and for separators used in the private unknown formats.

4. The ontology data import apparatus according to claim 3, wherein:
the private unknown formats are respectively represented as triples each of which is separated by specific separators.

5. The ontology data import apparatus according to claim 2, wherein:
when importing the input data, the private unknown format data importer device firstly imports the subject, and then determines a type property of the predicate and generates a range of values for the property, and finally imports the object in accordance with the determined type property of the predicate.

6. The ontology data import apparatus according to claim 5, wherein:
the private unknown format data importer device analyzes whether there is a numerical value as the object present in the triples having the predicate or not, and if there is a numerical value present as the object for the predicate, then it is determined that the predicate is of a numerical type property, and the range of values for the property is defined into a numerical type.

7. The ontology data import apparatus according to claim 6, wherein:
the private unknown format data importer device analyzes whether there is a numerical value for the predicate present in the triples having the predicate or not, and if there is not a numerical value present for the predicate, then it is further judged whether any object associated with the predicate can be found in the subjects; if it can be found in the subject, it is determined that the predicate is of an objective type property; and otherwise, if it can not be found, then it is determined that the predicate is of a numerical type property, and the range of values for the property is defined into a character string type.

8. An ontology data import method, comprising:
analyzing, by at least one processor, a format in which input ontology data is encoded, and performing format determination by utilizing an ontology format database which stores decoding information for decoding formats of successfully imported ontologies, the decoding information including decoding information for decoding a private unknown format; and
decoding, separating and importing, by the at least one processor, the encoded ontology data into an ontology database, which stores ontologies, in accordance with a result of the format determination,
wherein when analyzing the format in which the input ontology data is encoded, for a private unknown format, if the private unknown format contains format decoding information, then the format decoding information is directly extracted and the private unknown format is added into the ontology format database,
wherein when analyzing the format in which the input ontology data is encoded, for a private unknown format, if the private unknown format does not contain format decoding information, then the decoding information for decoding all private unknown formats stored in the ontology format database is fetched,
wherein if the private unknown format in which the input ontology data is encoded matches with any of the stored decoding information for decoding private unknown formats, then it is decided to use this matched decoding information for decoding the private unknown format,
wherein when analyzing the format in which the input ontology data is encoded, for a private unknown format, if the private unknown format does not contain format decoding information, then decoding information for decoding all private unknown formats stored in the ontology format database is fetched, and
wherein if the input private unknown format does not match with any of the stored decoding information for decoding private unknown formats, then n most-frequently used separators are extracted from a separator database in the ontology format database, and for each of the n separators, the following operations are repeatedly performed:
in the inputted contents, a search for this separator is performed;
if a position of this separator is correspondingly found, then forward and backward separator detections are continuously performed from this position;
an area consisting of continuous separators is determined as a separation area; and
if two separation areas are found, then a corresponding separation format is determined and generated as a detected private unknown format.

9. The ontology data import method according to claim 8, wherein:
the ontology database contains concepts, properties and instances respectively represented by triples each of which consists of a subject, a predicate and an object.

10. The ontology data import method according to claim 9, wherein the requested format is directly returned if it is a standard known format,
wherein the ontology data import method further comprises importing ontology data encoded in known formats into the ontology database,
wherein the decoding information for decoding formats of successfully imported ontologies that is stored in the ontology format database includes registered known ontology types and formats, previously used private unknown formats and statistics information, and
wherein the statistics information includes statistics records for successfully imported private unknown formats and for separators used in the private unknown formats.

11. The ontology data import method according to claim 10, wherein:
the private unknown formats are respectively represented as triples each of which is separated by specific separators.

12. The ontology data import method according to claim 9, wherein:
when importing the inputted data, the subject is firstly imported, and then a type property of the predicate is determined and a range of values for the property is generated, and finally the object is imported in accordance with the determined type property of the predicate.

13. The ontology data import method according to claim 12, wherein:
it is analyzed whether there is a numerical value as the object present in the triples having the predicate or not, and if there is a numerical value as the object present for the predicate, then it is determined that the predicate is of a numerical type property, and the range of values for the property is defined into a numerical type.

14. The ontology data import apparatus according to claim 13, wherein:
it is analyzed whether there is a numerical value as the object present in the triples having the predicate or not, and if there is not a numerical value as the object present for the predicate, then it is further judged whether any object associated with the predicate can be found in the subjects; if it can be found in the subject, it is determined that the predicate is of an objective type property; and otherwise, if it can not be found, then it is determined that the predicate is of a numerical type property, and the range of values for the property is defined into a character string type.

15. An ontology data export apparatus, comprising:
an ontology data export format analyzer device;
a combined keyword-based and query-language ontology exporter device configured to:

receive a keyword and/or an export format for encoding ontology data that is to be exported;

after processing the received keyword and/or export format into a query language, query ontology data stored in an ontology database which stores ontologies; and request an export format for encoding ontology data that is to be exported from the ontology data export format analyzer device;

wherein the ontology data export format analyzer device is configured to directly return the requested export format, or obtain the requested export format, by a query utilizing an ontology format database which stores decoding information for decoding formats of successfully imported ontologies, in accordance with the request from the combined keyword-based and query-language ontology exporter device;

wherein the combined keyword-based and query-language ontology exporter device is further configured to output a query result returned from the ontology database in accordance with the export format returned from the ontology data export format analyzer device, wherein the ontology data export format analyzer device is configured to judge whether or not the export command contains an export format for encoding ontology data that is to be exported, and if an export format for encoding ontology data that is to be exported is contained, then directly returns the requested export format, wherein if it is judged that the export command does not contain an export format for encoding ontology data that is to be exported, then the ontology data export format analyzer device returns the most-recently and most-frequently used import format in the ontology format database, and wherein the ontology data export format analyzer device is configured to determine the most-recently and most-frequently used import format as follows:

selecting all formats which have been used for successfully importing the private unknown format ontologies within a predetermined time period n from the ontology format database, denoted as a set of formats rs;

for each format r in the set of formats rs, calculating a usage rate rate thereof; and selecting a format corresponding to the maximum usage rate $rate_{max}$, as the export format for encoding ontology data that is to be exported, and returning it to the combined keyword-based and query-language ontology exporter device.

16. The ontology data export apparatus according to claim 15, wherein:

the ontology database contains concepts, properties and instances respectively represented by triples each of which consists of a subject, a predicate and an object.

17. The ontology data export apparatus according to claim 16, wherein the decoding information for decoding formats of successfully imported ontologies that is stored in the ontology format database includes registered known ontology types and formats, previously used private unknown formats and statistics information, and wherein the statistics information includes statistics records for successfully imported private unknown formats and for separators used in the private unknown formats.

18. The ontology data export apparatus according to claim 17, wherein:

the private unknown formats are respectively represented as triples each of which is separated by specific separators.

19. The ontology data export apparatus according to claim 15, wherein:

the combined keyword-based and query-language ontology exporter device is configured to generate the query language by the following operations:

acquiring and listing all domain ontologies in the ontology database;

acquiring and listing all concepts in the user selected domain ontology;

acquiring and listing all properties for the user selected concept;

adding a query condition consisting of the user selected property and a keyword inputted by the user for the property; and generating the query language in accordance with all the query conditions added by the user.

20. The ontology data export apparatus according to claim 19, wherein:

the combined keyword-based and query-language ontology exporter device is configured to generate the query language by the following further operations:

before the user confirms that all the query conditions have been added, allowing the user to delete and edit any of the added query conditions selected by the user; and after the user confirms that all the query conditions are ready, generating the query language.

21. The ontology data export apparatus according to claim 15, wherein:

if and only if the maximum usage rate $rate_{max}$ is larger than a predetermined threshold, then the ontology data export format analyzer device considers the format corresponding to the maximum usage rate $rate_{max}$ as the export format for encoding ontology data that is to be exported.

22. The ontology data export apparatus according to claim 21, wherein:

if the maximum usage rate $rate_{max}$ is not larger than the predetermined threshold, then the ontology data export format analyzer device increases a duration of the predetermined time period n, decreases the predetermined threshold, and then resumes the selection of the export format for encoding ontology data that is to be exported.

23. An ontology data export method, comprising:

receiving, by at least one processor, a keyword and/or an export format for encoding ontology data that is to be exported;

after processing, by the at least one processor, the received keyword and/or export format into a query language, querying, by the at least one processor, ontology data stored in an ontology database which stores ontologies, and requesting an export format for encoding ontology data that is to be exported;

directly returning, by the at least one processor, the requested export format or obtaining, by the at least one processor, the requested export format by a query utilizing an ontology format database which stores decoding information for decoding formats of successfully imported ontologies, in accordance with the request for the export format; and outputting, by the at least one processor, a query result returned from the ontology database in accordance with the returned export format, wherein it is judged whether or not the export command contains an export format for encoding ontology data that is to be exported, and if an export format for encoding ontology data that is to be exported is contained, then the requested export format is directly returned, wherein if it is judged that the export command does not contain an export format for encoding ontology data that is to be exported, then the most-recently and most-frequently used import format in the ontology format database is returned, and wherein the determining the most-recently and most-frequently used import format comprises the following:

selecting all formats which have been used for successfully importing the private unknown format ontologies within a predetermined time period n from the ontology format database, denoted as a set of formats rs;

for each format r in the set of formats rs, calculating a usage rate rate thereof; and selecting a format corresponding to the maximum usage rate $rate_{max}$, as the export format for encoding ontology data that is to be exported.

24. The ontology data export method according to claim 23, wherein:

the ontology database contains concepts, properties and instances respectively represented by triples each of which consists of a subject, a predicate and an object.

25. The ontology data export method according to claim 24, wherein the decoding information for decoding formats of successfully imported ontologies that is stored in the ontology format database includes registered known ontology types and formats, previously used private unknown formats and statistics information, and wherein the statistics information includes statistics records for successfully imported private unknown formats and for separators used in the private unknown formats.

26. The ontology data export method according to claim 25, wherein:

the private unknown formats are respectively represented as triples each of which is separated by a specific separator.

27. The ontology data export method according to claim 23, wherein:

the generating the query language comprises the following:

acquiring and listing all domain ontologies in the ontology database;

acquiring and listing all concepts in the user selected domain ontology;

acquiring and listing all properties for the user selected concept;

adding a query condition consisting of the user selected property and a keyword inputted by the user for the property; and generating the query language in accordance with all the query conditions added by the user.

28. The ontology data export method according to claim 27, wherein:

the generating the query language further comprises the following:

before the user confirms that all the query conditions have been added, allowing the user to delete and edit any of the added query conditions selected by the user; and after the user confirms that all the query conditions are ready, generating the query language.

29. The ontology data export method according to claim 23, wherein:

if and only if the maximum usage rate $rate_{max}$ is larger than a predetermined threshold, then the format corresponding to the maximum usage rate $rate_{max}$ is considered as the export format for encoding ontology data that is to be exported.

30. The ontology data export method according to claim 29, wherein:

if the maximum usage rate $rate_{max}$ is not larger than the predetermined threshold, then a duration of the predetermined time period n is increased, the predetermined threshold is decreased, and then the selection of the export format for encoding ontology data that is to be exported is resumed.

31. An ontology data import/export apparatus, comprising:

an ontology data import apparatus according to claim 1; and an ontology data export apparatus according to claim 15.

* * * * *